United States Patent
Mars et al.

(10) Patent No.: US 10,721,625 B2
(45) Date of Patent: Jul. 21, 2020

(54) UNIVERSAL PERSONAL IDENTIFICATION SIGNAL

(71) Applicant: PROXY TECHNOLOGIES, INC., San Francisco, CA (US)

(72) Inventors: Denis Mars, Redwood Shores, CA (US); Simon Ratner, San Francisco, CA (US)

(73) Assignee: Proxy, Inc., San Francisco, CA (US)

( * ) Notice: Subject to any disclaimer, the term of this patent is extended or adjusted under 35 U.S.C. 154(b) by 312 days.

(21) Appl. No.: 15/716,464

(22) Filed: Sep. 26, 2017

(65) Prior Publication Data
US 2019/0098505 A1 Mar. 28, 2019

(51) Int. Cl.
*H04L 12/08* (2006.01)
*H04W 12/08* (2009.01)
*H04L 29/06* (2006.01)
*H04W 48/10* (2009.01)
*H04W 12/06* (2009.01)

(52) U.S. Cl.
CPC .......... *H04W 12/08* (2013.01); *H04L 63/101* (2013.01); *H04L 63/102* (2013.01); *H04W 12/06* (2013.01); *H04W 48/10* (2013.01)

(58) Field of Classification Search
CPC ..... H04W 12/08; H04W 48/10; H04W 12/06; H04W 8/005; H04L 63/101; H04L 63/102
See application file for complete search history.

(56) References Cited

U.S. PATENT DOCUMENTS

| 6,647,497 | B1 * | 11/2003 | Cromer | G06F 21/88 726/16 |
| 7,382,253 | B2 * | 6/2008 | Oliveras | G06Q 10/087 235/385 |
| 2007/0155370 | A1 * | 7/2007 | Daigle | H04M 3/42042 455/415 |
| 2009/0305219 | A1 * | 12/2009 | Stuempfle | G09B 5/06 434/365 |
| 2011/0277025 | A1 * | 11/2011 | Counterman | G06F 21/40 726/8 |
| 2016/0154460 | A1 * | 6/2016 | von Liechtenstein | H04L 63/0407 345/156 |
| 2019/0098505 | A1 * | 3/2019 | Mars | H04W 12/06 |

* cited by examiner

*Primary Examiner* — Farid Homayounmehr
*Assistant Examiner* — Sanchit K Sarker (57) ABSTRACT

A universal identity and physical presence detection in the form of a personal, universal transponder signal is described. This signal allows a user to interact with devices in the user's environment without having to download vendor-specific apps, set up vendor-specific accounts or be limited to a siloed eco-system of a manufacturer brand. The universal signal representing an individual allows for devices and software to detect and query the beacon transmitting the signal for information relating to the user and augmented onto the physical environment. This provides a more personalized, efficient, and, in some instances, secure experience for the user. Embodiments focus on minimizing user workload to allow for seamless interactions with her environment. Various embodiments provide a truly universal signal for all users and devices to interact, wherein all parties benefit from a seamless and natural way of interacting in the physical world.

20 Claims, 8 Drawing Sheets

UNIVERSAL PERSONAL IDENTIFICATION SIGNAL

BACKGROUND

1. Field

Disclosed herein is information that relates to a system and software for enabling a personal, universal identifier signal to allow for interactions between an individual and a device, such as an appliance. More specifically, it relates to implementing the universal signal and ensuring security, privacy, and authentication during interactions between users and devices in a physical environment.

2. Description of the Related Art

Presently, attempts to create what is referred to as a universal identification (ID) signal for an individual have involved frameworks or underlying models in which the burden of implementing the signal—broadcasting it and ensuring that devices detect it—rests on the individual. This task of creating a personal signal or what is sometimes referred to as a transponder or beacon that can be picked up by a wide array of devices in varying environments or physical spaces is, not surprisingly, typically beyond the technical domain of the vast majority of regular users. This is one of several barriers that has prevented the growth of a truly universal identification signal for individuals, universal in the sense that the signal is not tied or detectable only to a specific manufacturer, social media or network provider, or company.

One of the goals of a universal signal is to allow a user to identify and interact with a variety of physical world devices or objects by different manufacturers in a manner that allows for strict data control, security, and privacy. In some cases this is being done, but the framework follows a "silo" model. That is, users emit a signal, such as from a smart phone, but the signal is only detectable by a specific entity, such as an appliance manufacturer, car manufacturer, or online social media provider, to name just a few examples. The signal is not truly universal; in fact, far from it, the framework enables interaction with a sliver of the physical world. These so-called "siloed" signals do not provide the right mapping to physical, real world environments and spaces that is needed for a truly useful, safe, and secure universal signal.

There are some implementations, presently in limited use, that essentially leverage one online identity or profile to interact with various types of devices. Besides the security and data control/privacy concerns this raises, such single online personas do not truly reflect how individuals behave or act in the real, physical world. Human interactions with physical environments have developed over millennia, as such, it should not be expected that this behavior be reflected in online personas.

Other factors that have prevented universal or even quasi-universal signal technology from widespread adoption include generally a lack of motivation from manufacturers and companies to create their own apps, portals, back-end infrastructure, and so on, that would be needed to implement a signal or beacon framework with their customers. Again, this leads to a siloed approach that is simply not worth the expense and maintenance for many entities. Returning to the first point of placing too much of the technical burden of implementing universal signals on the users, it is helpful to keep in mind that beacon technology presently exists. It is certainly possible to create sensing points in an environment, but this framework requires that users modify their behavior, act in a different way and actually require that additional actions be taken by users. What is needed is a framework that does not require this of users and where the physical world or environment be essentially smarter and place minimal additional burden on the users to allow for seamless natural interactions.

SUMMARY

One aspect disclosed is a method of enabling a universal identifier signal, also referred to as a universal personal transponder, using a beacon apparatus and a detector apparatus that performs as a scanner or sensor. The beacon, in many cases a smartphone or other smart apparatus carried by a user, broadcasts what is referred to as an ephemeral identifier. This identifier, among numerous other functions, is enabled by a universal signal application installed on the smartphone or smart apparatus. This ephemeral ID is detected or sensed by a detector device which is essentially constantly scanning the environment for ephemeral IDs and related data. The detector apparatus can be a wide variety of device, such as appliances, electronic equipment, public kiosks, and the like. The detector device resolves the ephemeral ID to a specific beacon apparatus user, that is, the ID is matched to a specific registered individual or user. A dedicated server, typically operated by a universal signal service provider, finds and verifies an access-control list for the specific registered user connected to the ephemeral ID. A first set of user data is then transmitted to the detector apparatus, such as the door lock, coffee machine, kitchen appliance, TV monitor, etc., by the dedicated server. The detector device then performs operations to enable substantive and meaningful interactions with the beacon (i.e., the user). In this manner, the actions required by the beacon device are minimized and the majority of the operations are taken on by the detector device. That is, the user and the user's smartphone does not need to perform any proactive operations or acts in order to have the user's universal ID signal recognized by the door lock or have meaningful interaction with the door lock, such as unlocking the door for the user.

In another aspect of the invention, a system for implementing a universal personal transponder environment includes a beacon apparatus carried by a user that includes personal transponder software. The user enters an environment or space that has one or more scanner devices which are constantly scanning for a universal signal being emitted by the beacon by virtue of the transponder software. The detection of the signal occurs with minimal operations or actions needed by the user or the beacon apparatus. The software module on the beacon enables interaction with nearly any type of scanner device that has the necessary transponder software and hardware connectivity component. A dedicated server has a database for storing various types of data and multiple software modules for implementing the universal personal transponder environment. The server may be operated and owned by a universal personal transponder service provider which operates the system for the benefit of the user and the scanner or detector device manufacturers or operators which, as noted, may include a wide variety of device from door locks to electronic equipment. The majority of the processing and proactive steps needed to implement the environment is done by the scanner device which queries the beacon (e.g., smartphone) for data, communicates with the dedicated server, and initiates a session with the beacon. The beacon also performs some steps to ensure security and authentication, as does the scanner device, but the burden of initiating the process and establishing a session is performed by the scanner device.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the described embodiments as defined by the appended claims.

For example, methods and systems will be described in the context of creating, utilizing, and managing security and authentication for a universal, personal ID signal. In the following description, numerous specific details are set forth in order to provide a thorough understanding of the various embodiments. Particular example embodiments may be implemented without some or all of these specific details. In other instances, well known process operations have not been described in detail in order not to unnecessarily obscure the described embodiments. Various techniques and mechanisms will sometimes be described in singular form for clarity.

However, it should be noted that some embodiments include multiple iterations of a technique or multiple instantiations of a mechanism or technique unless noted otherwise. For example, a system uses a processor in a variety of contexts. However, it will be appreciated that a system can use multiple processors while remaining within the scope of the described embodiments unless otherwise noted. Furthermore, the techniques and mechanisms will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Various embodiments describe providing universal identity and physical presence detection in the form of a personal, universal signal. This signal allows a user to interact with devices in the user's environment without having to download vendor-specific apps, set up vendor-specific accounts or be limited to a siloed eco-system of a manufacturer brand. Such a personal universal signal representing an individual allows for devices and software to detect and query the beacon transmitting the signal for information relating to the user and augmented onto the physical environment. This provides a more personalized, efficient, and, in some instances, secure experience for the user.

The embodiments focus on minimizing user workload to allow for seamless interactions with her environment, such as, for example, the user being able to walk up to a TV anywhere in the world and the TV (using the user's universal signal) detecting the user and querying the user's personal preferences and accounts. The user can then, using voice commands, for example telling the TV to play their favorite TV show by saying "play Game of Thrones." The TV, having the user's authenticated universal signal, and therefore access to the user information and subsequent accounts (e.g., Netflix account), can then pull up the show and play it instantly. This can all be done without the user using a TV specific app, setting up a TV specific account, or being limited by the make and brand of TV, and without ownership of the TV. In another example, a user can walk up to a door, and the door automatically unlocks for the user once the user reaches a distance close enough such that the user can passively walk through the door without having to do anything because the door sensed the user's universal signal and verified that the user has access to pass through the door. Again, this is done without the user being tied to the door manufacturer, or device, or to a specific account or app needed to serve such interaction. As such, the various embodiments provide a truly universal signal for all users and devices to interact, wherein all parties benefit from a seamless and natural way of interacting in the physical world.

Methods and systems for implementing a smart environment where a user's presence is sensed by a scanner are described in the various figures. In one embodiment, the environment is a physical space in which scanners detect the presence of a user via a universal identifier signal that is emitted from the user's mobile device which operates as a personal beacon. However, in this framework, the scanners perform most of the operations and, as such, the beacon, for example, being emitted from a user's phone or watch, workload is significantly reduced. In this respect, by taking the burden of implementing the universal ID signal, the environment or physical space may be described as intelligent or smart. The users simply need to do move around and behave as they normally would. The devices around them in the space or environment they are moving in detects them and performs the necessary communications and processing to realize the benefits of the universal identifier signal of the present invention.

Figure 1:
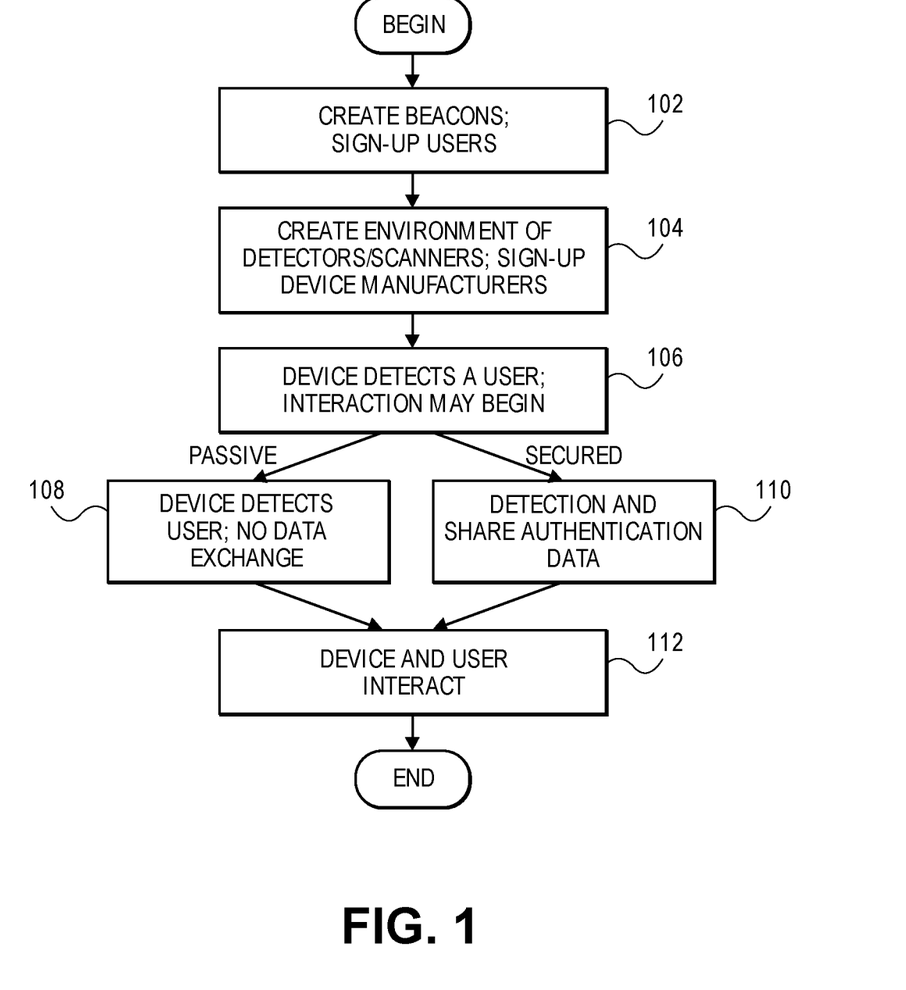
FIG. 1 is an overview flow diagram of a process in accordance with one embodiment.

FIG. 1 is an overview flow diagram of a process in accordance with one embodiment. At step 102 an entity operates as a beacon and moves around in a physical space. In the described embodiment, the entity is a human being and the space can be any environment such as a home, an office, a retail store, a lobby, a public space, a sidewalk, to name a few examples. Another way to describe it is that an entity can be any object or thing for which a universal ID signal would be useful, such as a car, bicycle, or animal. At step 104 an environment or space in which at least one scanner operates is created. A scanner can be manifested or implemented in many ways. In the described embodiment, a scanner (also referred to as "device" herein; beacons, typically mobile devices, are referred to herein as "beacon" "user" or "smartphone") can be a home appliance, door lock, monitor, a car, a kiosk, a consumer electronic device, and so on. The type of devices found in an environment or space will naturally be dependent on the nature of the space. At step 104, manufacturers or other entities which either make the scanners or operate or manage them are signed up and registered to have scanners in the environment. A home will have different types of devices than a retail store or an office lobby, and so on. A common feature of most devices or scanners in the described embodiment is that they are generally stationary; they are not expected to move around in the physical space, but they can and the inventive concepts described herein would still apply. At step 106 a device detects a beacon by virtue of the beacon signal and initial interaction between device and beacon may begin.

The initial interaction may be one of two types. One is referred to as passive interaction shown in step 108. Here the device detects the presence of a beacon signal. The device may not determine the identity of the user, that is, the user remains anonymous. In another passive mode embodiment, the user may be identified but only in a dedicated server operated, typically, by a service provider, described below, and not on the device itself. Although generally this back-end server will be online, in one embodiment the server, that is, the service provider, may be accessible without an Internet connection or being online (e.g., via Ethernet, Zigbee, and the like). This passive scanning or detecting presence of a beacon may be useful in various contexts, such as counting the number of people in a room or space, or whether someone just walked into a space. Essentially, the device wants to sense users around it, but the individual dictates the privacy. The user is the gatekeeper on his or her identity. The device that detects or sense the presence of the user may interact, it may do something, but that action does not have privacy concerns or require user authorization, hence, the passive nature of the interaction.

Another type of interaction that may be initiated is referred to as secured exchange where there is authentication of the user shown in step 110. Here tokens are used to authenticate and the device can make authorization requests. One example that illustrates this clearly is where the device is a door lock which detects the presence of a user and will only unlock if the user is authorized to open the door; the user must prove to the device (door lock) that she has access to open the door. In one embodiment, tokens are used to prove that the user is authorized. The beacon signal has at least one signed token from a back-end server that authenticates the user to the device. Once this authentication is made, the device will perform the relevant action and interact with the user. It may be noted that in either passive or secured exchange scenarios, the device may interact with the user as shown in step 112, but the level or degree of interaction will naturally vary.

Figure 2:
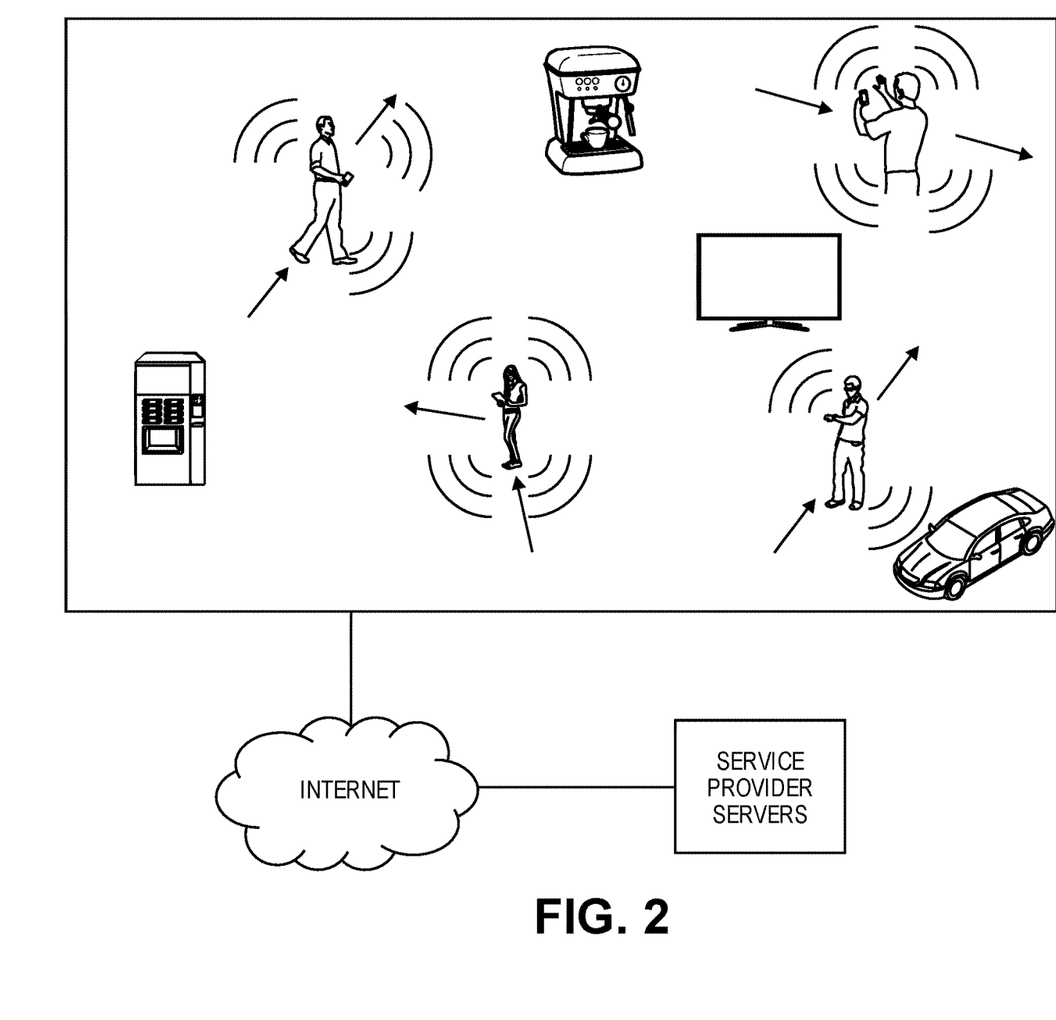
FIG. 2 is an illustration of a physical environment showing different types of devices and users with beacons.

FIG. 2 is an illustration of a physical environment showing different types of devices and users with beacons. Beacons can take various forms, most are Internet-enabled, but the most common are smartphones and wearables, such as watches or bracelets and may include bio-implants and other forms of personal mounted fixtures. As noted, the user will most likely be an individual, but may also be a moving object or an animal, such as a pet. Also shown are devices which can take on many forms, most are Internet-enabled. Devices may be home appliances and electronics, office equipment, ranging from refrigerators, coffee makers, door locks, TVs, vending machines, kiosks, cars, monitors, and so on. As described in greater detail below, a device may have its own server contained in it (to do universal signal actions) or may not need a service provider server at all. In the described embodiment the device accesses a service provider server to carry out some or all of the operations needed for the present invention. A service provider server, also referred to as the back-end server, is also shown. This server has numerous roles, but one of the primary ones is to authenticate the user and maintain access-control lists for beacons and devices. This back-end server is maintained and operated by the universal ID signal service provider which is responsible for implementing the universal ID signal and smart environment of the present invention. It provides a software module or app that the user installs on her smart phone or wearable thereby enabling it as a personal beacon. And it provides software, hardware or both to device manufacturers and operators. For example, it can provide a software development kit (SDK) for the manufacturer or detector/scanning hardware, such as a Bluetooth module or sensor, if the manufacturer or device operator needs such a hardware component to put in their device. For example, a lock manufacturer may not have the technical means or desire to obtain the appropriate sensor needed for the invention so the service provider can provide the sensor hardware to them and instruct them on how to install it. The device manufacturer will decide what type of capabilities their device(s) will need when interacting with users and what type of security and authorization will be required from its users. It instructs the service provider on what data it needs from the beacon in order to interact securely and safely with its users.

Figure 3:
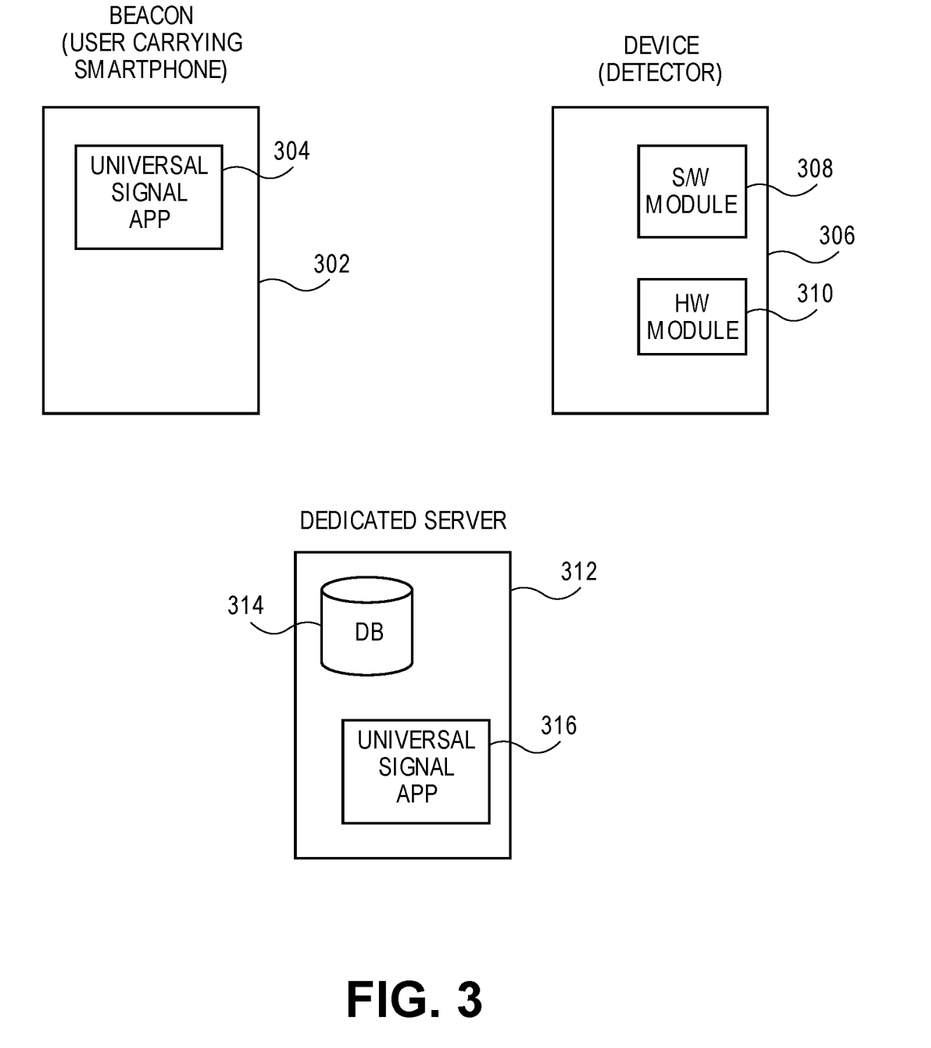
FIG. 3 is a block diagram showing three primary components needed for implementing various embodiments of the present invention.

FIG. 3 is a block diagram showing three primary components needed for implementing various embodiments of the present invention. A user acts like a beacon 302. The user, in nearly all instances, a single individual (in some cases a "user" may be a group of people like a family, a group of co-workers, a team, etc.) carries an apparatus that acts as the beacon. As noted, this can be a smartphone, bracelet, watch, or any suitable wearable device. Beacon 302 has installed on it a service provider software module 304, that implements the personal universal ID signal of the present invention.

A device 306 acts as the detector or scanner in the environment. As described, device 306 can take the form of one of a multitude of objects from ranging from appliances to electronic equipment to public vending machines. Nearly all have a software module 308 that is provided by the service provider and installed either by the provider or by the manufacturer. Software module 308, as well as module 304, performs many of the operations described in the flow diagrams below. In some embodiments, device 306 may also have a hardware component 310, such as a Bluetooth component or other hardware needed for connectivity with beacon 302 or with a dedicated server, the other component in FIG. 3. This hardware component may be provided by the service provider.

A service provider server 312 is operated and managed by the universal ID signal provider and may have extensive software modules, such as the universal signal app 316, and at least one database 314 which stores data on beacons (users), devices, access control tables, and a wide variety of data needed to implement the universal signal environment of the present invention.

Figure 4A:
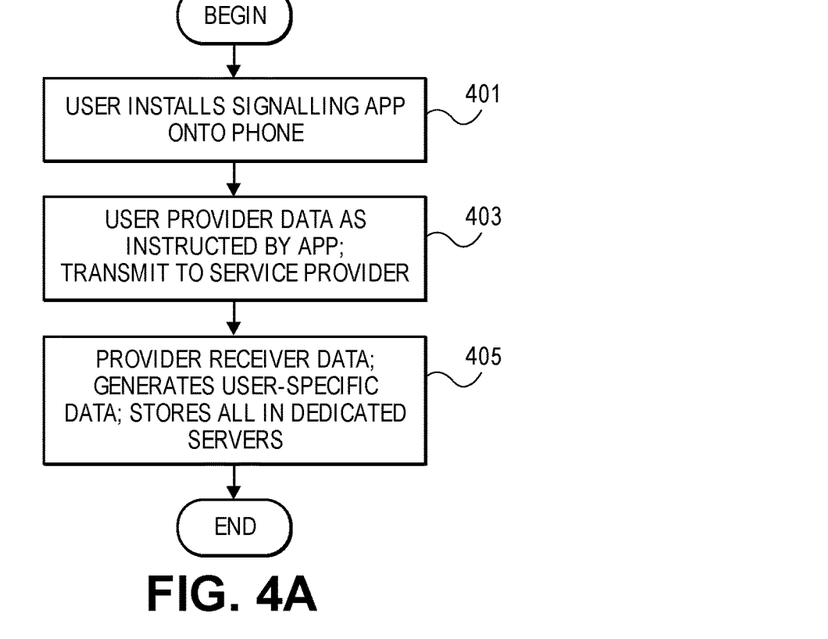
FIG. 4A is a flow diagram of a process of a user joining the universal ID signal framework as implemented by a service provider in accordance with one embodiment.

FIG. 4A is a flow diagram of a process of a user joining the universal ID signal framework as implemented by a service provider in accordance with one embodiment. A user, typically an individual, has decided to join the universal ID signal framework. In one context, an employer may ask all it employees to join so that the advantages of the universal signal can be realized in an office or company campus environment. The first step taken by the user is shown at step 401 where the user downloads a service provider universal ID signal app ("app") onto her smart phone or wearable apparatus (for ease of explanation, collectively referred to as "smartphone"). Generally, the app can operate in most widely used personal devices, platforms or operating systems, such as Android, iOS, and others that run on phones, watches, bracelets, tablets, bio-chips and the like.

Once downloaded and installed, at step 403 the user enters at least some required basic information about herself. Some of the information can be entered at a later time depending on the apparatus that the app is being installed on. In one embodiment, a subset of the data entered by the user results in the creation of various identifiers. One may be referred to generically as a unique ID whose use is limited in that it is used primarily, if not only, by the service provider. This unique ID is not sent to the device, such as an appliance, door lock, coffee machine, etc. Another is a randomly generated identifier, referred to herein as a temporary or ephemeral ID. In one embodiment, this ephemeral ID is broadcasted from the app on the user's smartphone. This ephimeral ID, for example, may be used for anonymous detection by a device of the user. Another identifier created from the user data is referred to as a persistent ID, an ID that can be characterized as stable and is created for each user/device manufacturer pair. For example, a user will have different persistent IDs for her relationship with the monitor, another for her relationship with the coffee machine, the car, the door lock, and so on. Each device manufacturer gets a distinct persistent ID for each user (assuming one device from each manufacturer). It may be described as a persistent or permanent version of an ephemeral ID. At step 405 the data entered and created at step 403 is stored in service provider or manufacture's own dedicated servers, in most cases this will be the service provider servers.

Figure 4B:
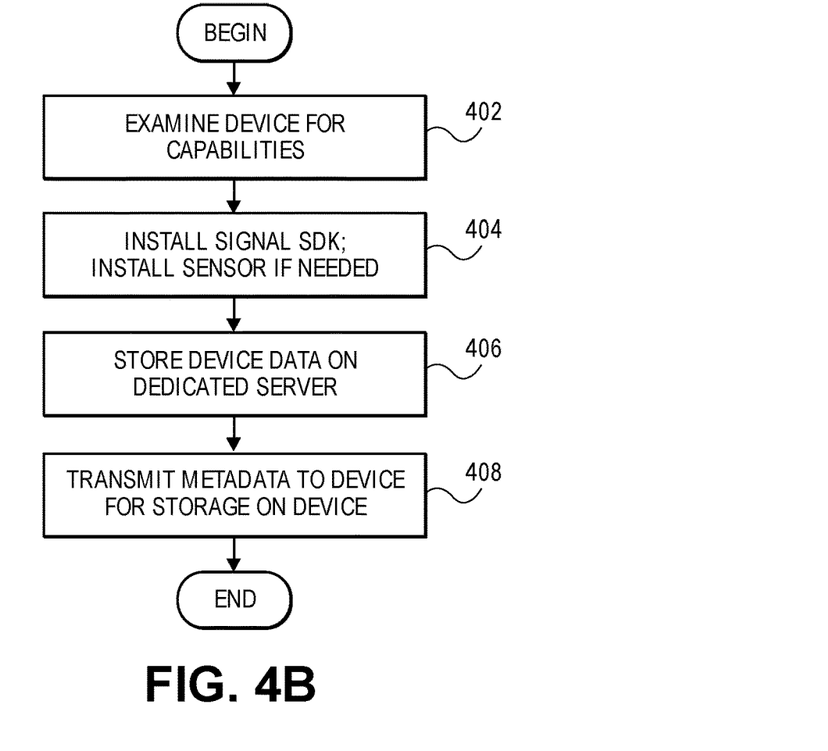
FIG. 4B is a flow diagram of a process of registering and initializing a device so that it can be a universal ID signal sensing device in a physical space in accordance with one embodiment.

FIG. 4B is a flow diagram of a process of registering and initializing a device so that it can be a universal ID signal sensing device in a physical space in accordance with one embodiment. At step 402 the service provider determines whether the device has the necessary hardware for being a scanner as needed for implementing the present invention (since the device is new to the space and universal ID framework, the service provider knows that the device does not have the universal ID app yet). The service provider obtains a wide variety of data and metadata about the device, items such as device name, category, location, identifier(s), make, model, time zone and so on. Some of this data is used to let the user know what the device is exactly when she encounters it in a physical real world space and wants to decide whether to interact with it. However, the threshold question determined at step 402 is whether the device has the right hardware. If it does, the service provider only needs to supply and install universal ID signal software which, in the described embodiment, is in the form of a software development kit (SDK) as shown in step 404. If the device does not have the right hardware for scanning (some smaller scale manufacturers may not have the means or technical skills to include this hardware in their product) the service provider provides one. In this case the software module and the sensor hardware are installed on the device which may be done by the device maker or the service provider.

At step 406 information describing the device is stored by the service provider in a database. This data is required for enabling interaction between the device and the beacon. In some scenarios, the data needed for this interaction may be stored on the device itself wherein the service provider does not play an active role. Some examples of data stored include device ID, single key, private/public key pair, set of commands and interactions, actions the user or device can take, a template which can be customized for different devices. In one embodiment, a template may be described as a pre-defined schema of attributes and metadata. In a simple example, a template for a door lock can have "lock" and "unlock" whereas a template for a car would likely have many more options. At step 408 metadata describing to the device and templates are transmitted to the device and stored there.

Figure 5:
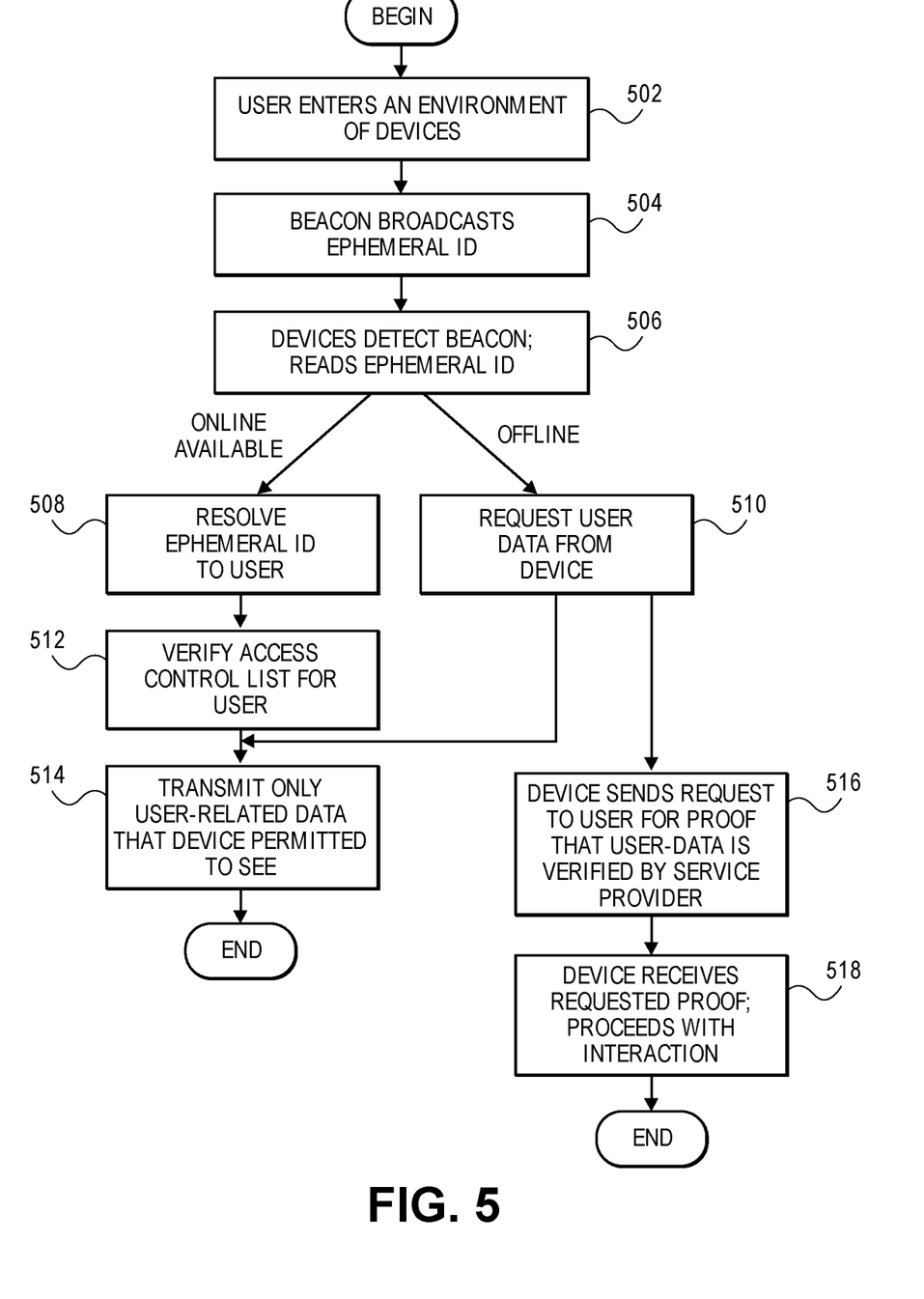
FIG. 5 is a flow diagram of a process of passive detection of a universal signal presence in accordance with one embodiment.

At the end of FIG. 4B, the device is now capable of detecting or sensing a beacon when a beacon with the universal ID signal app executing on it is in the presence of the device. FIG. 5 is a flow diagram of a process of passive detection of a universal signal presence in accordance with one embodiment. At step 502 a user (as noted, the term "user" is interchangeable with "beacon" and "smartphone") enters an environment or physical space that has scanning devices. It is important to note here that the user is in control of her personal universal ID signal. The user can turn the signal on (by executing the app downloaded at step 401) or not turn it on. There are also measures that can be taken to ensure that the universal signal is coming from the right individual and not an imposter or some other intentional or unintentional unauthorized person. At step 502 the user turns on the signal via a smartphone or wearable apparatus once another factor has passed. For example, the signal turns on only after a smart watch has detected the user's heart pattern or other biometric means to verify the identity of the user wearing the watch or carrying the smartphone. Only at this point is the signal turned on. This prevents other individuals from impersonating the user by wearing the user's smart watch or other wearable. At step 504 a beacon in the environment broadcasts the ephemeral ID. At step 506 a device detects or senses the beacon and reads the beacon's ephemeral ID. A non-persistent minimal connection is established initially between the beacon and the device. The universal ID signal app does not tie up the device exclusively (unlike other IoT devices). Because of the non-persistent nature of the connection some typical scaling issues are avoided. No permanent bonding or tie-up is needed in the personal universal ID signal implementation and framework of the present invention.

Steps 502 to 506 describe what can be referred to as a sub-process for ambient sensing of the beacon by a device. It may be characterized as the simplest use case scenario for the universal ID signal. Ambient sensing can be used in scenarios where users simply have to be distinguished from one another, such as counting how many users are near a device or in a room. This ambient sensing may also be seen as a way for a user to potentially communicate with a device if needed. If communication is possible and the dedicated server, such as a service provider server, can be accessed, the process continues with step 508. In another embodiment, the dedicated server can be accessed via another communication means, such as Bluetooth, Ethernet, and the like.

At step 508, the service provider server learns private data about the user. It does this by taking the ephemeral ID and resolving it to an actual or real user (as noted, prior to this step, the user was merely an anonymous but distinguishable entity). At step 512 the back-end verifies permissions attached to the user by examining an access control list. At step 514 the back-end sends user data based on the access control list to the device, in other words, it sends to the device only data about the user that the device is allowed to see. The back-end stores a matrix of permissions, policies, preferences, and the like regarding users and devices. In one embodiment, it uses the user's persistent ID which, as noted, is particular to that user and a specific device pairing.

Returning to step 506, if there is no ephemeral ID or the data needed is already on the device, characterized as a "local only" option, the data needed for sensing the beacon is on the device itself and user data is requested from the device instead of from a service provider server.

The passive branch shown in FIG. 1 has been described in FIG. 5 steps 502 to 514. Steps 510, 516, and 518 illustrate the secure branch from FIG. 1. As noted, at step 510, in the "local only" step, when the device does not access service provider servers via the Internet, user data is requested from the device. Steps 516 and 518 are needed because the service provider is not able to authenticate user data or any type of data from the smartphone. The perspective of the queries and actions taken in steps 516 and 518 are from the device perspective. At step 516 the device or, more specifically, the universal ID signal software module on the device, needs to be able to verify that data it is receiving from the beacon at some point has been verified by the service provider and is still valid. The device wants to see that the data (the data basically conveying, for instance, "I am John Smith's smartphone") has been vouched for by the back-end server, but that the authentication and identity data the device receives has been verified. In one embodiment, this is done without using any of the IDs described above (emphemeral, persistent, unique, etc.). Instead data used to verify the identity depends on the scanning device. For example, the data could be an authenticated version of the user's driver license, or verification of the user's voice or face recognition as matched with a known hash of the user's voice recording or facial image (for example, stored on the user's smartphone) of the user as biometric authentication that the user is the correct, intended user. Once the device receives this proof or is otherwise confident that the data it is receiving is authentic, control goes to step 518. Here the device receives proof from the smartphone that the user identity data is authentic and that the device can perform the action, such as unlocking a door, turning a TV on to the user's preferred channel, or make coffee how the user likes it.

Figure 6:
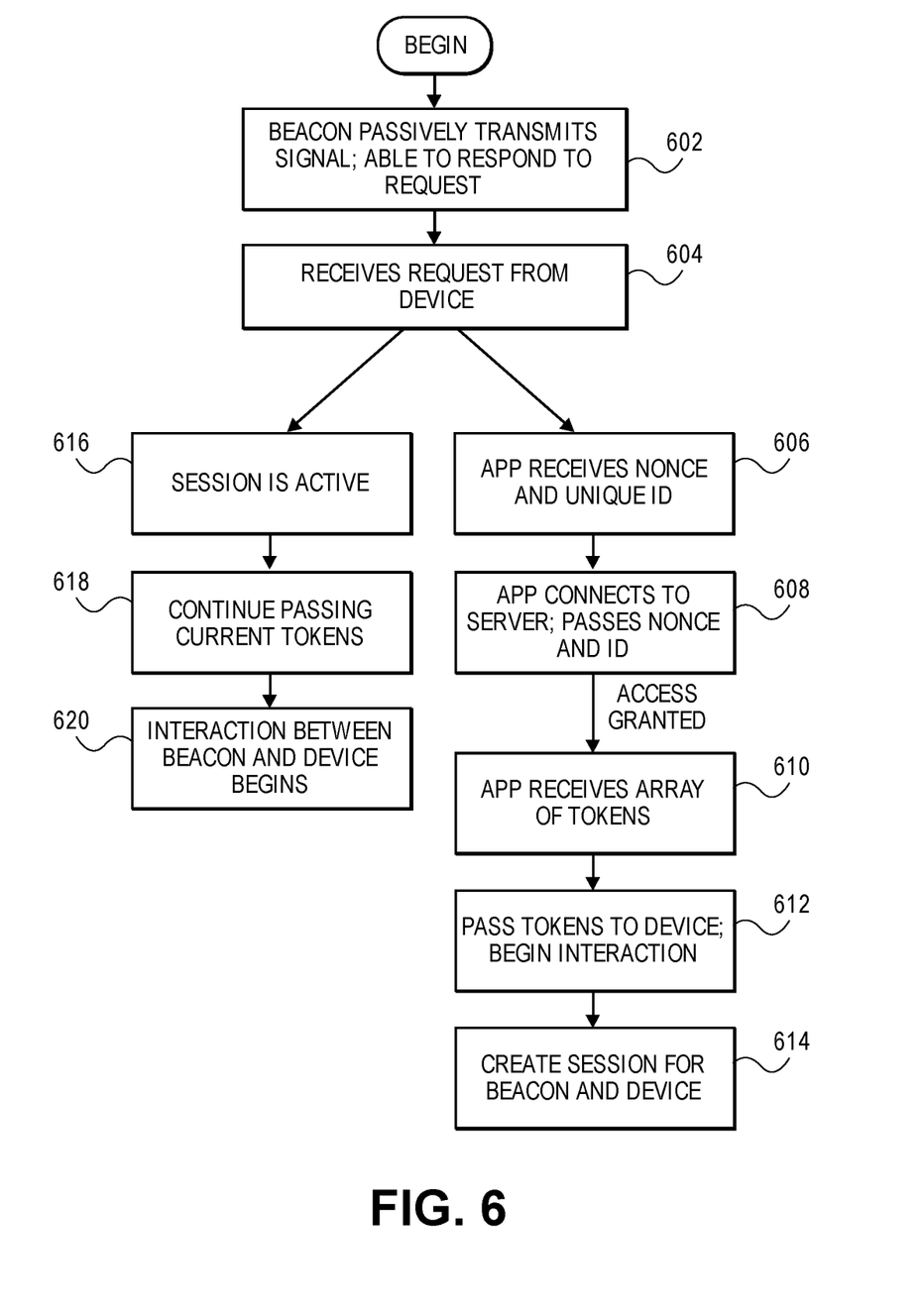
FIG. 6 is a flow diagram of a process of transmitting a universal ID signal between a beacon and a device and initiating interaction between them in accordance with one embodiment.

FIG. 6 is a flow diagram of a process of transmitting a universal ID signal between a beacon and a device and initiating interaction between them in accordance with one embodiment. At step 602 the smartphone or wearable being carried by a user has entered a physical space with universal signal-enabled devices and is passively transmitting a universal ID signal. In one embodiment, this is done by the app in the background essentially when the beacon apparatus is powered on. In other embodiments, the app can be terminated or, in contrast, be in the foreground, and be transmitting a universal, personal ID signal. It is also able to detect a request from a device and respond. Although the beacon has the universal ID signal app from the service provider, it does not need anything from the device manufacturer in order to receive the request from the device or respond to it. As noted above, the invention bypasses any form of a "silo" arrangement or framework. The sensors in the devices that are scanning can connect to the beacons.

At step 604 the beacon receives a request from the device. The app is able to either recognize the request or not. If it does not recognize the request from the device or has not seen a request from the device for a long time (a time exceeding a predetermined threshold), control goes to step 606. The app requests a non-repeatable value or nonce from the device and a fixed unique ID for that device. In other embodiments, this ID can come from the service provider server or through other means, such as through an ID tag via near-field communication or an iBeacon associated with the device. At step 606 the app receives these values.

At step 608 the app connects to the service provider server and transmits these two values to the server. Assuming the server is able to identify the unique ID as belonging to the device, it grants access between the device and the beacon. The server uses the nonce for deriving a token as described below. More specifically, it enables access control and security by transmitting an array of tokens to the smart phone. If the server cannot recognize the device from the ID or determines that there is no interest from the user in accessing or interacting with the device, then tokens are not passed to the smartphone. In some cases, metadata may be passed to the smartphone which provides publically available, insecure information related to the device such that the user can act on the information. For example, the device may be a public device, such as a kiosk or parking meter, and although most of the time the user is likely to ignore the device, if the user wants to learn more about the device (e.g., remaining parking time or rate), the user would be able to do so with the data returned by the dedicated server. In one embodiment, a token has one component that is derived from combining the nonce, the unique device ID, device-specific data, time-limited data, user restrictions, and so on. It is an important feature of the present invention that communications between the device and user be secure. All the values and factors that go into making the token play a critical role in making the entire universal ID signal framework secure. The second component of a single token is referred to as a payload section and contains data on user preferences and generally to the user and device. In one embodiment, each token in the array is valid for a limited time period, such as for a few minutes, hours, or days. An array may have a few hundred tokens and can be used to prove validity from a few hours to several days. For example, for commercial building access, a token may last for 4-5 hours and be replenished often to ensure that there are tokens to last the user through the day.

In another embodiment, where access to a service provider server may not be available, tokens can be generated on a device, such as a lock, using other factors, such as biometrics fingerprint, voice recognition, face recognition or retina scanner part of the device, geo-location, expiration time, and so on. These features can also be used even if there is access to the service provider server to provide stronger security. As is known in the art, a token is a signed data item, intended to be used once and discarded (as does an entire array of tokens). Getting back to the importance of security in a universal ID signal framework, the array of tokens that is sent from the service provider server to the smart phone, together with other security features, prevents possible hacking and malfeasance, for instance, "replaying" or emulation (harmful devices emulating valid, authorized devices), among others.

At step 612 the app passes one of the tokens from the array or the entire array of tokens to the device. The device validates the tokens and interactions between the user and the device can begin. More specifically, the universal ID signal software module on the device validates the tokens and sends a message to the smart phone stating that they can now communicate. Upon receiving this message, at step 614 the beacon creates a session and the two can now interact.

Returning to step 604, if the beacon app recognizes the request from the device, control continues with step 616 where a session between the smartphone and the device is already active. This session is of the same type as the one created at step 614. The array of tokens may be stored in a cache or local storage on the smartphone. By doing so, the smartphone does not have to be online; it can be offline and operate fast. At step 618 the smartphone continues passing tokens to the device. The smartphone keeps the tokens for a predetermined amount of time, a threshold of time that balances security and user convenience, for example, a few hours. After that time has expired, the app gets a new array of tokens from the service provider. If they have not expired, the smartphone can keep using the tokens in the array. At step 620 the interaction between the user and the device can resume. In this manner, that is by executing the operations in steps 604 to 614 or steps 604, 616, 618, and 620, a secure, truly universal ID signal that is usable by many different types of devices (from various manufacturers) and users can be implemented.

Figure 7:
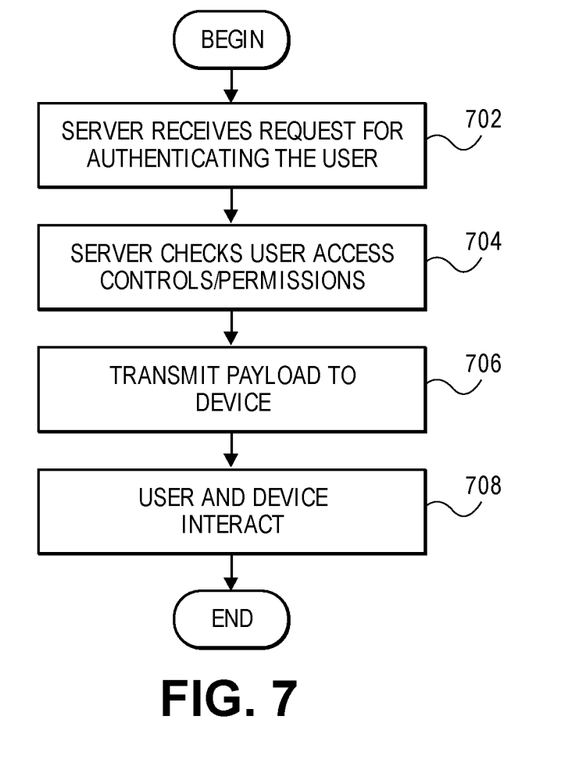
FIG. 7 is a flow diagram of a process of operations that occur on the device when the device is online in accordance with one embodiment.

FIG. 7 is a flow diagram of a process of operations that occur on the device when the device is online in accordance with one embodiment. At step 702 the service provider server receives a request from a device, for example a car or an appliance, for authenticating a user. It is helpful to note that a device can only see users who have allowed that specific device to recognize or see them (a category of devices or a specific manufacturer or member group may also be specified. Similarly, in some physical environments, such as a workplace or other secured area, a user is only allowed to see devices that an overseeing entity (e.g., employer) says she is allowed to see or recognize. In other contexts, a device maker may only want users with certain features or characteristics to be able to see or recognize its devices. Various types of scenarios are possible in which either the user or the device maker or owner, manager, and the like can set security protocols regarding who or what can be recognized using the universal ID signal. For example, one benefit of this type of security is that it prevents the equivalent of spamming on both sides. In all scenarios, the underlying security principle that is implemented in the various embodiments of the invention is that either side—user or device—only gets to see and receive what it needs to in order to interact, and can only get to that point if the user or device is authorized to see the other. At step 704 the service provider server checks user access controls to see if the user is authorized to use the device and if so what controls or limits are there. There are different techniques or transport mechanisms for how this user access control check can be performed by the service provider. For example, in one embodiment, there may be an out-of-band token exchange or a token server. The common factor is translating the random, non-identifying ID for the user that was transmitted initially to the device into a full set of information about the user. This information can be used in a permission check process. At step 706, assuming the user is authenticated, the service provider server transmits the payload to the device so now the device knows the user's preferences, permissions, interaction history, and other information. At step 708 the user and device can begin substantive interaction.

Figure 8:
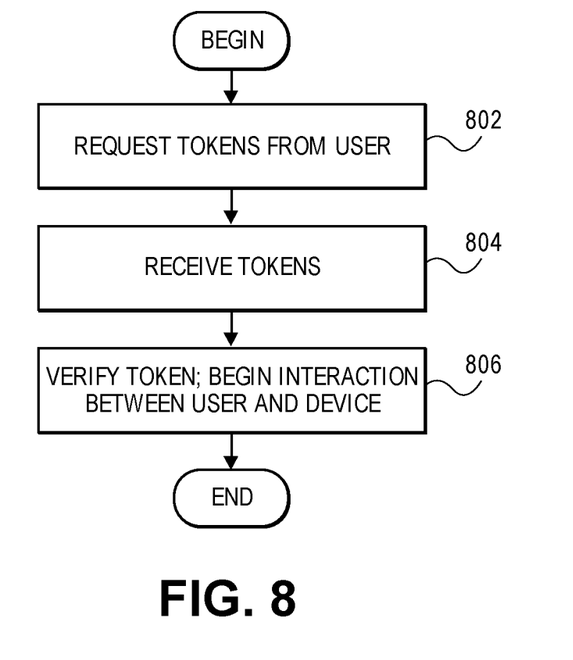
FIG. 8 is a flow diagram of a process that occurs on the device when the device is offline in accordance with one embodiment.

FIG. 8 is a flow diagram of a process that occurs on the device when the device is offline in accordance with one embodiment. The end goal of this process is essentially the same as that of FIG. 7, except here the device does not communicate with the service provider server. At step 802 the device makes a request for an array of tokens from the user. The nature and characteristics of this array of tokens are the same as the token array described above. At step 804 the device receives a token from the beacon. At step 806 the device proceeds with verifying the token using only local resources. In various embodiments, it can verify or check the signature in the tokens, it can check to ensure it has not expired or has not been used before. Through these means and others, if available locally, the device authenticates the user and interaction between the user (who may or may not be online) and the offline device can begin. As noted above, with regard to security, one important aspect of that is embedded in the validation period of a token. This period can vary from a few minutes to several weeks. A token for a coffee machine may last 20 days whereas for a lock or for making payments, a token may expire after one hour. This security feature is typically set by the device manufacturer; they decide how long to wait before a user has to re-authenticate with the device. Generally, users will have little input in this regard. Another scenario not described in FIGS. 7 and 8 is when the device and smartphone are both unable to reach a service provider or dedicated server and have not connected or interacted with each other before. In this scenario, even though the smartphone has the universal ID signal app and the device registered with the service provider, there is no recognition of each other, let alone any interaction.

Figure 9:
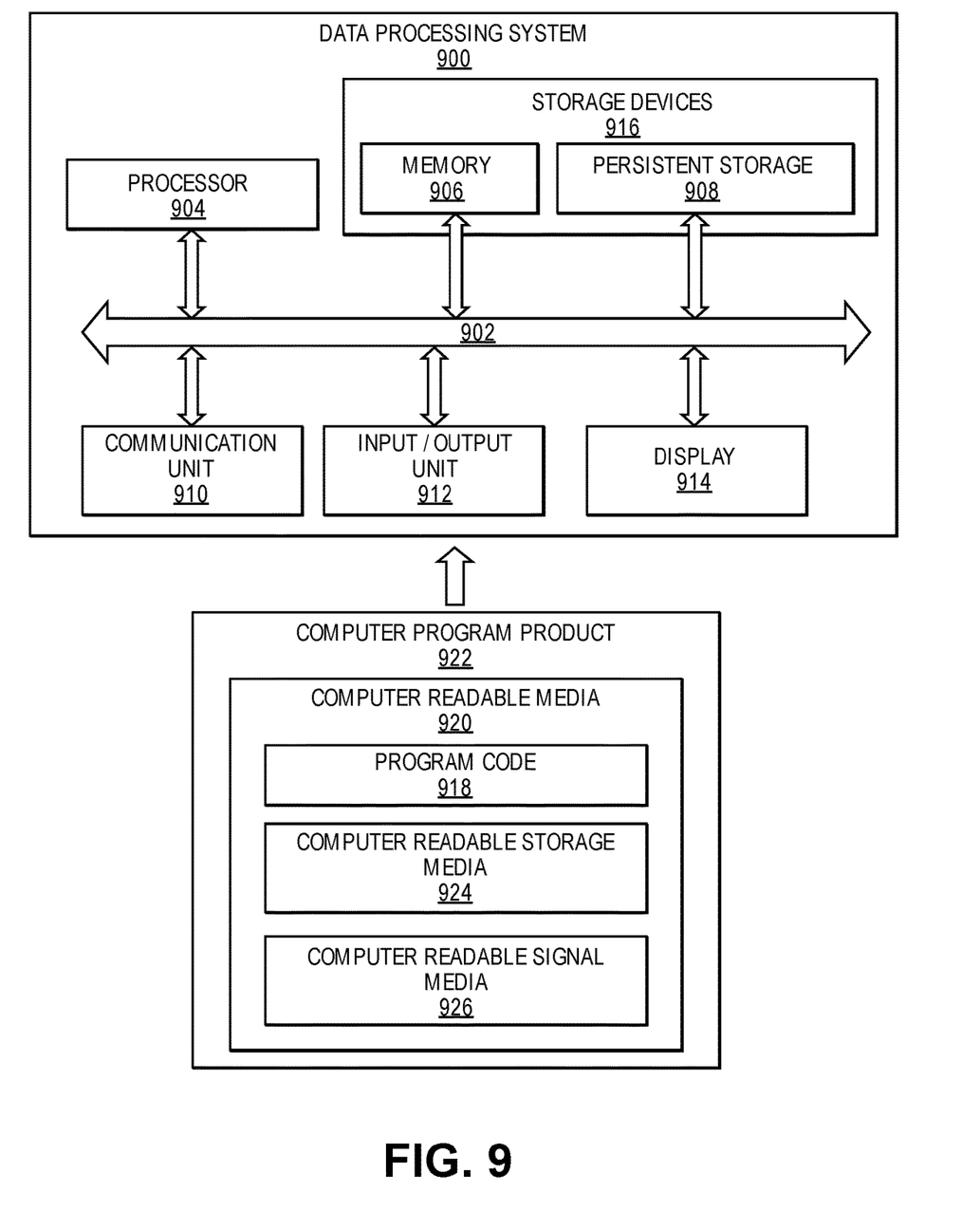
FIG. 9 is a block diagram illustrating an example of a computer system capable of implementing various processes in the described embodiments.

FIG. 9 is an illustration of a data processing system 900 is depicted in accordance with some embodiments. Data processing system 900 may be used to implement one or more computers used in a controller or other components of various systems described above. In some embodiments, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device.

Persistent storage 908 may take various forms, depending on the particular implementation. For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transmitted to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transmitted to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown.

The different embodiments may be implemented using any hardware device or system capable of running program code 918.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of enabling a universal signal using a beacon and a detector, the method comprising:
    passively transmitting the universal signal from the beacon to the detector, wherein the universal signal is not permanently associated with the beacon;
    transmitting, in response to the universal signal, a request signal from the detector, wherein the request signal comprises a non-repeatable value and a unique detector ID;
    receiving the request signal at the beacon;
    transmitting from the beacon, data comprising the request signal to a server associated with a service provider;
    transmitting from the beacon, the universal signal to the server associated with a service provider;
    authenticating in the server associated with a service provider, the beacon in response to the universal signal;
    determining in the server associated with a service provider an array of tokens in response to the request signal and to authenticating the beacon;
    receiving an array of tokens at the beacon from the server associated with a service provider in response to the data;
    transmitting at least one token of the array of tokens to the detector; and directing with the detector a physical action to be performed by an electronic device coupled to the detector in response to the one token;
    passively transmitting the universal signal from the beacon to another detector, wherein the universal signal is not permanently associated with the beacon;
    transmitting, in response to the universal signal, another request signal from the other detector, wherein the other request signal comprises another request for another non-repeatable value and another unique detector ID;
    receiving the other request signal at the beacon;
    transmitting from the beacon, the other request signal and the universal signal to the server associated with a service provider;
    determining in the server associated with a service provider another array of tokens in response to the other request signal and to authenticating the beacon;
    receiving the other array of tokens at the other beacon from the server associated with a service provider in response to the other request signal; and
    transmitting from the beacon at least one token of the array of tokens to the other detector, thereby creating a session between the beacon and the other detector.

2. The method as recited in claim 1 wherein the non-repeatable value comprises a nonce.

3. The method as recited in claim 1 further comprising: creating in the server associated with a service provider, the plurality of tokens in response to the non-repeatable value, the unique detector ID, a detector-specific data set, and a time value.

4. The method as recited in claim 1 wherein the array of tokens is comprised of one-time tokens, that are digitally signed by the server associated with a service provider.

5. The method of claim 1 further comprising:
wherein the transmitting the request signal from the detector comprises: transmitting via Bluetooth protocols, the request signal from a Bluetooth transceiver in the detector to the beacon.

6. The method of claim 5 further comprising:
wherein the transmitting the one token of the array of tokens to the detector comprises transmitting under direction of an application on a smart device the one token to the detector;
wherein the application is associated with the service provider.

7. The method of claim 1 further comprising: authenticating in the detector the one token; and wherein the directing with the detector the physical action comprises directing with the detector the physical action to be performed by the electronic device in response to the one token and in response to the one token being authenticated.

8. The method of claim 7 wherein the electronic device is selected from a group consisting of: an appliance, office equipment, a door lock, a television, a vending machine, a kiosk, an automobile, a monitor.

9. The method of claim 7 wherein the physical action is selected from a group consisting of: unlocking a door, turning on the electronic device, tuning a television, vending a good, logging into an online service.

10. The method of claim 1
wherein an identity of a user associated with the beacon is known to the server associated with the service provider; and
wherein the identity of the user associated with the beacon remains anonymous with respect to the detector.

11. A system for enabling a universal signal comprising:
a hardware server associated with a service provider;
a detector;
a beacon coupled to the hardware server and to the detector, wherein the beacon is configured to passively transmit the universal signal to the detector, wherein the universal signal is not permanently associated with the beacon; and
another detector coupled to the beacon;
wherein the detector is configured to transmit a request signal comprising a non-repeatable value and a unique detector ID to the beacon in response to the universal signal;
wherein the beacon is configured to transmit data comprising the request signal to the hardware server in response to the request signal;
wherein the beacon is configured to transmit the universal signal to the hardware server;
wherein the hardware server is configured to authenticate the beacon, in response to the universal signal; and
wherein the hardware server is configured to determine an array of tokens in response to the request signal and to authenticating the beacon;
wherein the hardware server is configured to transmit the array of tokens to the beacon;
wherein the beacon is configured to transmit at least one token of the array of tokens to the detector;
wherein the detector is configured to direct a physical action to be performed by an electronic device coupled to the detector in response to the one token;
wherein the beacon is configured to passively transmit the universal signal to the other detector, wherein the universal signal is not permanently associated with the beacon;
wherein the other detector is configured to transmit another request signal comprising another non-repeatable value and another unique detector ID to the beacon in response to the universal signal;
wherein the beacon is configured to transmit data comprising the other request signal to the hardware server in response to the other request signal;
wherein the hardware server is configured to authenticate the beacon, in response to the universal signal;
wherein the hardware server is configured to determine another array of tokens in response to the request signal and authenticating the beacon;
wherein the hardware server is configured to transmit the other array of tokens to the beacon;
wherein the beacon is configured to transmit at least another token of the other array of tokens to the other detector; and
wherein the other detector is configured to direct a physical action to be performed by another electronic device coupled to the other detector in response to the other token.

12. The system as recited in claim 11 wherein the non-repeatable value comprises a nonce.

13. The system as recited in claim 11 wherein the hardware server is configured to determine the plurality of tokens in response to the non-repeatable value, the unique detector ID, a detector-specific data set, and a time value.

14. The system as recited in claim 11 wherein the hardware server is configured to digitally sign the array of tokens.

15. The system of claim 11
wherein the beacon is selected from a group consisting of: a smart phone, a smart bracelet, a smart watch, a tablet, a bio-chip, and a wearable device.

16. The system of claim 11
wherein the detector comprises a Bluetooth transmitter configured to transmit the request signal comprising the non-repeatable value and the unique detector ID to the beacon in response to the universal signal.

17. The system of claim 11
wherein the detector is configured to authenticate the one token; and
wherein the detector is configured to direct the physical action to be performed by the electronic device coupled to the detector in response to the one token being authenticated.

18. The system of claim 17 wherein the electronic device is selected from a group consisting of: an appliance, office equipment, a door lock, a television, a vending machine, a kiosk, an automobile, a monitor.

19. The system of claim 17 wherein the physical action is selected from a group consisting of: unlocking a door, turning on the electronic device, tuning a television, vending a good, logging into an online service.

20. The system of claim 11
wherein an identity of a user associated with the beacon is known to the hardware server; and wherein the identity of the user associated with the beacon remains anonymous with respect to the detector.

* * * * *